United States Patent [19]

Spector

[11] Patent Number: 6,004,016
[45] Date of Patent: Dec. 21, 1999

[54] MOTION PLANNING AND CONTROL FOR SYSTEMS WITH MULTIPLE MOBILE OBJECTS

[75] Inventor: Victor A. Spector, Gardena, Calif.

[73] Assignee: TRW Inc., Redondo Beach, Calif.

[21] Appl. No.: 08/692,733

[22] Filed: Aug. 6, 1996

[51] Int. Cl.[6] .......................... G05B 19/18; G05B 19/04
[52] U.S. Cl. .................. 364/167.02; 395/82; 395/90
[58] Field of Search .......................... 364/167.01, 433, 364/474.28, 167.02; 701/301; 395/82, 90

[56] References Cited

U.S. PATENT DOCUMENTS

| | | | |
|---|---|---|---|
| 4,578,757 | 3/1986 | Stark | 701/301 |
| 4,644,237 | 2/1987 | Frushour et al. | 318/640 |
| 4,862,373 | 8/1989 | Meng | 701/209 |
| 4,949,277 | 8/1990 | Trovato et al. | 395/90 |
| 5,006,988 | 4/1991 | Borenstein et al. | 701/25 |
| 5,047,916 | 9/1991 | Kondo | 364/167.01 |
| 5,056,031 | 10/1991 | Nakano et al. | 701/301 |
| 5,083,256 | 1/1992 | Trovato et al. | 364/148 |
| 5,204,942 | 4/1993 | Otera et al. | 395/83 |
| 5,220,497 | 6/1993 | Trovato et al. | 364/167.01 |
| 5,227,707 | 7/1993 | Mitomi et al. | 318/568.1 |
| 5,247,608 | 9/1993 | Flemming et al. | 395/90 |
| 5,283,739 | 2/1994 | Summerville et al. | 701/23 |
| 5,325,468 | 6/1994 | Terasaki et al. | 395/97 |
| 5,336,982 | 8/1994 | Backes | 318/568.22 |
| 5,341,459 | 8/1994 | Backes | 395/95 |
| 5,343,385 | 8/1994 | Joskowicz et al. | 364/167.01 |
| 5,347,459 | 9/1994 | Greenspan et al. | 395/90 |
| 5,349,533 | 9/1994 | Libby | 701/301 |
| 5,764,510 | 6/1998 | Cameron et al. | 364/167.02 |
| 5,808,887 | 9/1998 | Dorst et al. | 345/474 |

FOREIGN PATENT DOCUMENTS

| | | | |
|---|---|---|---|
| 61-260306 | 11/1986 | Japan | G05B 19/405 |
| 2-260008 | 10/1990 | Japan | G05B 19/403 |
| 3-156610 | 7/1991 | Japan | G05B 19/403 |
| 5-119815 | 5/1993 | Japan | G05B 19/18 |
| WO 96 14967 | 11/1995 | WIPO . | |

OTHER PUBLICATIONS

Azarm, K. et al., Conflict–Free Motion of Multiple Mobile Robots based on decentralized motion Planning and Negotiation, IEEE, 1997, pp. 3526–3533.

Yng–Ping Chien, Path Planning for two Planar Robots moving in Unknown Environment, IEEE, Mar. 1992.

Tomas Lozano–Perez, Spatial Planning: A Configuration Space Approach, IEEE, Feb. 1983.

(List continued on next page.)

*Primary Examiner*—Emmanuel L. Moise
*Assistant Examiner*—Shelly A Chase
*Attorney, Agent, or Firm*—Michael S. Yatsko

[57] ABSTRACT

A method and apparatus for path planning and execution of movements of multiple mobile objects, such as robotic manipulators (64, 66), in a common workspace. Path planning at a relatively coarse scale yields, for each object, path definitions (24) in configuration space (c-space), which is an n-dimensional space, where there are n degrees of freedom of movement of each object. The coarse path definitions are interpolated to provide primary control signals (54) to execute object movements, in combination with collision avoidance control signals (56) derived from an artificial force field model (46) that generates repulsion forces based on mutual proximity of the objects. Path planning includes determining which subregions or cells of c-space are subject to potential collision, and selecting multiple trial path segments until a path is found around those cells. For execution, the coarse scale path parameters, are expanded to a finer scale by interpolation (40), and the artificial force field model generates additional control signals (56) corresponding to the repulsion forces needed to maintain separation of the objects in the workspace.

28 Claims, 9 Drawing Sheets

OTHER PUBLICATIONS

Jacak, W., et al., "Distributed Planning and Control of Intelligent Robot's Arm Motion Based on Symbolic and Neural Processing," 1995 IEEE International Conference on Systems, Man and Cybernetics, Vancouver, Oct. 22–25, 1995, vol. 3 of 5, Oct. 1995, Institute of Electrical and Electronics Engineers, pp. 2898–2903, XP000586420.

Juang, J.G., Robot Collision Avoidance Control Using Distance Computation, 1995 IEEE International Conference on Systems, Man and Cybernetics, Vancouver, Oct. 22–25, 1995, vol. 3 of 5, Oct. 1995, Institute of Electrical and Electronics Engineers, pp. 2564–2569, XP000586393.

Sano, T., et al., "Adaptive Control For Manipulator With Avoiding the Collision Problem," Proceedings of the International Conference on Industrial Electronic Control and Instrumentation. (IECON), Bologna, Sep. 5–9, 1994, Special Sessions, Signal Processing Control, vol. 3 of 3, Sep. 1994, Institute of Electrical and Electronics Engineers, pp. 1853–1858, XP000526818.

Yamamoto, M., et al., "Collision Free Mminimum Time Trajectory Planning for Manipulators Using Global Search and Gradient Method," Proceedings of the IEEE/RSJ/GI International Conference on Intelligent Robots and Systems: Advanced Robotics and The Real World, Munich, Sep. 12–16, 1994, vol. 3, Sep. 1994, Institute of Electrical and Electronics Engineers, pp. 2184–2191, XP000510687.

Liu, Y–H, "Motion Planning with Dynamic Constraints for Manipulators in the Presence of Moving Obstacles," Proceedings of the IEEE/RSJ/GI International Conference on Intelligent Robots and Systems: Advanced Robitics and The Real World, Munich, Sep. 12–16, 1994, vol. 3, Sep. 1994, Institute of Electrical and Electronics Engineers, pp. 1930–1937, XP000510654.

Ralli, E., et al., "Fast Path Planning for Robot Manipulators Using Numerical Potential Fields in the Configuration Space," Proceedings of the IEEE/RSJ/GI International Conference on Intelligent Robots and Systems: Advanced Robotics and The Real World, Munich, Sep. 12–16, 1994, vol. 3, Sep. 1994, Institute of Electrical and Electronics Engineers, pp. 1922–1929, XP000510653.

Cameron, J.M., et al., "Reactive Control for Mobile Manipulation," Proceedings of the International Conference on Robotics and Automat, Atlanta, May 2–6, 1993, vol. 3, May 1993, Institute of Electrical and Electronics Engineers, pp. 228–235, XP000409814.

MOTION PLANNING AND CONTROL FOR SYSTEMS WITH MULTIPLE MOBILE OBJECTS

BACKGROUND OF THE INVENTION

This invention relates generally to the control of multiple mobile objects to avoid collisions with each other and with other obstacles. More specifically, the invention relates to motion planning and control of multiple robotic manipulators. Robotic manipulators are used in a variety of industrial and commercial applications, to perform tasks such as assembly, disassembly, machining, repair, maintenance and inspection of components. Applications may include sequential or simultaneous combinations of these functions and may involve coordinated motion of multiple manipulators. Basically, a robotic manipulator comprises a tool that is movable to a desired point in three-dimensional space, by means of multiple mechanical links, connected together by joints. The tool, sometimes referred to as an end-effector, may be a gripper, a welding torch, a cutting device, an electromagnet, or other device.

The manipulator may be best visualized in its most common form, in which the tool is connected to a base or frame through a series of rigid mechanical links, which are connected one to the next through joints or gimbals that are simple pivot joints, sometimes referred to as revolute joints. Manipulators may also include other types of joints, involving combinations of sliding and rotational displacement. The positions of the links are defined by multiple joint angles or gimbal angles. A given set of gimbal angles defines a specific position of the tool. Deriving the tool position from a set of gimbal angles is a straightforward problem, usually referred to as involving forward kinetics. A much more difficult problem, involving reverse or inverse kinetics, is the determination of appropriate gimbal angles from a given tool position, which may be defined by multiple sets of gimbal angles.

The present invention pertains to robotic path planning, i.e., the movement of robotic manipulator tools from one point to another in three-dimensional space. Because each position of the tool generally may be defined by any of multiple sets of gimbal angles, the movement of the tool from one position to another may be accomplished over any of multiple paths. One technique for robotic mechanism path planning uses configuration space, sometimes referred to as joint space, instead of Cartesian space, to define the tool positions. The term configuration space (or c-space) will be used in this specification. The tool position in c-space is defined by the gimbal or joint angles. If there are n gimbals, the c-space will have n dimensions. Path planning in c-space has been proposed as a solution for a number of problems that arise in the use of multiple manipulators. See, for example, Lozano-Perez, *Spatial Planning: A Configuration Space Approach*, IEEE Transactions on Computers, Vol. 32, No. 2, pp. 108–120, February 1983. Fixed obstacles can be "mapped" into c-space so that, in theory, paths can be planned to avoid them, as well as to avoid collisions between manipulator components.

Robotic path planning is an inherently difficult problem for several reasons, such as:

1) The need to perform global planning, that is, to plan a complete move or move sequence from start to end. More local planning often leads to difficulties such as "hunting" for the correct path, dead-end paths, and contention, requiring back-tracking to plan a different path.

2) The need to avoid inadvertent collisions between the manipulators, workpieces on which the tools operate, and the work environment. Collisions can damage the manipulators, the workpieces, or the work environment, causing economic loss or unacceptable safety hazards.

3) The need to work within limited ranges of travel for each axis of each manipulator, since each gimbal may have stops that provide for only a limited range of angular motion. Hitting a gimbal stop may not only halt a current operation, but may also cause physical damage. Manual intervention may be required to restart the operation.

4) The need to resolve the inherent ambiguity in specifying the manipulator gimbal angles to achieve a desired tool location and orientation, i.e., the inverse kinematics problem.

b 5) The need to work within dynamic limitations of the motion, such as limitations in rate, acceleration and jerk. Dynamic limitations arise both from safety concerns and hardware component limitations.

In principle, use of the c-space technique provides a possible solution to the first four of these problems. In practice, however, direct application of the c-space approach results in an excessive computational burden, as explained by Canny, John C., *The Complexity of Robot Motion Planning*, Ph.D. dissertation, Department of Electrical Engineering and Computer Science, MIT, Cambridge, Mass., May 1987 (also published in book form). For example, using a pure c-space cell approach for a system of three 3-axis manipulators, each axis having a 360E range, and assuming a modest resolution of 0.1E, would require computation and storage of $(360/0.1)^{3+3+3} = 3,600^9$ or about $10^{32}$ cells. No current or projected technology exists for performing a computation of this magnitude.

Another approach to collision avoidance in robotic manipulators uses an artificial potential or force field analogy to keep manipulator components from colliding. Simply stated, this approach generates manipulator "repulsion" forces based on the relative proximity of the manipulators. The closer that two manipulators are to each other, the greater the repulsion force becomes. Basically, each manipulator is controlled to move along a primary path toward its intended destination, but may be deflected from the path by the repulsion forces generated when the path takes the manipulator too close to another manipulator or too close to a fixed obstacle.

Although using artificial potential fields avoids the computational complexity of the conventional c-space approach, the use of artificial potential fields raises other difficulties. In particular, the potential field for a general manipulator system may have local minima that lead to hunting, including non-periodic oscillations and chaotic motion, dead-ends, stopping at a equalibrium position that is not the desired goal position, and contention, a situation in which the system settles into a limit cycle without reaching the goal position.

It will be appreciated from the foregoing that there is still a need for a technique of path planning for multiple manipulators such that collisions are avoided but the problems associated with c-space path planning and artificial potential collision avoidance are minimized. The present invention satisfies this need.

SUMMARY OF THE INVENTION

The present invention resides in apparatus and a corresponding method for path planning and execution of movements of multiple mobile objects in a common workspace, wherein the position of each object is dependent on the configuration of a plurality of interconnected linkages, as defined by a plurality, n, of configuration settings corresponding to n degrees of freedom of the object. Briefly, and in general terms, the apparatus of the invention comprises a path planner and a path execution module. The path planner functions to plan in advance a series of movements of each of the mobile objects, to provide a relatively coarse scale plan for the movements. The path planner determines paths in a configuration space defined by n orthogonal axes corresponding to the n configuration settings that define the position of each object in three-dimensional space. The path execution module is operable to move the objects in accordance with the relatively coarse scale plan provided by the path planner, and includes a fine-scale artificial force field collision avoidance subsystem, to provide control signals to the movable objects such that they are moved along paths determined in part by the path planner and in part by the collision avoidance subsystem. Accordingly, the objects are moved from starting points to desired endpoints without collisions with each other or with any stationary obstacles.

More specifically, the path planner includes a configuration-space database defining the workspace as multiple n-dimensional cells; database generation logic, for determining a collision status for each cell of the configuration-space database, wherein the collision status is either "full," indicating that there is a potential for collision for all combinations of configuration settings within the cell, or "free," indicating that there is no potential for collision in the cell, or "mixed," indicating that there is potential for collision for some combinations of configuration settings within the cell; and a path planning executive module using information about each cell of the configuration-space database, to plan a path from one point in configuration space to another, in such a manner that collisions are avoided. The path planner further includes means for selecting a first trial path and determining whether the path passes through any full or mixed cells; and means for systematically selecting a second and other trial paths, if the earlier selected trial paths are subject to collision, wherein a collision-free path is ultimately selected. The means for systematically selecting a second and other trial paths preferably includes means for detecting a midpoint in a portion of the trial path that passes through a collision region of full or mixed cells; and means for selecting a trial waypoint located on a line through the midpoint and orthogonal to the trial path that passes through the midpoint. If not in the collision region, the trial waypoint is selected to be on the planned path. If the trial waypoint is in the collision region, another is selected, and so forth until a collision free path is planned.

The path execution module includes, in more specific terms, a waypoint interpolator, to generate finer resolution paths from the path data provided by the path planner; a control law module for generating control signals based on the finer resolution paths through configuration space and on predicted configuration settings of the objects; a collision avoidance force model, for generating collision avoidance control signals based on mutual proximity of objects in the workspace; and means for combining the collision avoidance control signals and the control signals from the control law module, wherein collision avoidance is achieved on a fine scale by modifying the paths planned through the configuration space. The path execution module further includes an object dynamic model, for providing estimates of object configuration settings for use by the control law module and the collision avoidance force model.

In terms of a novel method, the invention comprises the steps of planning a path, controlling the path execution, and applying control signals to the mobile objects. The planning step includes planning in advance a path having series of movements of each of the mobile objects, to provide a relatively coarse scale plan for the movements. The planning step determines paths in a configuration space defined by n orthogonal axes corresponding to the n configuration settings that define the position of each object in three-dimensional space. In the controlling step, execution of the planned path is controlled in such a way as to move the objects primarily in accordance with the relatively coarse scale plan provided by the planning step, and including an additional step of generating collision avoidance object control signals based on an artificial force field model. The step of applying control signals to the movable objects moves the objects along path segments determined in part by the path planning step and in part by the step of controlling the path execution. The objects are, therefore, moved from starting points to desired endpoints without collisions with each other or with any stationary obstacles.

More specifically, the path planning step includes setting up a configuration-space database defining the workspace as multiple n-dimensional cells; determining a collision status for each cell of the configuration space database, wherein the collision status is either "full," indicating that there is a potential for collision for all combinations of configuration settings within the cell, or "free," indicating that there is no potential for collision in the cell, or "mixed," indicating that there is potential for collision for some combinations of configuration settings within the cell; and generating a coarse path plan using information about each cell of the configuration-space database, to provide for movement in a path from one point in configuration space to another in such a manner that collisions are avoided.

The step of generating a coarse path plan further includes selecting a first trial path and determining whether the path passes through any full or mixed cells; and systematically selecting a second and other trial paths, if the earlier selected trial paths are subject to collision, wherein a collision-free path is ultimately selected. The step of systematically selecting a second and other trial paths includes detecting a midpoint in a portion of the trial path that passes through a collision region of full or mixed cells; and selecting a trial waypoint located on a line through the midpoint and orthogonal to the trial path that passes through the midpoint, wherein the trial waypoint is selected as being on the planned path if the trial waypoint is not in the collision region.

In the preferred embodiment of the invention, the step of controlling the path execution movement includes interpolating between coarse path planning waypoints to generate finer resolution planned paths; generating control signals based on the finer resolution paths through configuration space and on predicted configuration settings of the objects; generating collision avoidance control signals based on mutual proximity of objects in the workspace; and combining the collision avoidance control signals and the control signals based on the finer resolution planned paths. Collision avoidance is achieved by modifying the paths planned through the configuration space. The step of controlling the path execution may further include dynamically modeling movement of the objects, to provide estimates of object configuration settings for use in the step of generating control signals based on the finer resolution paths and in the step of generating collision avoidance control signals.

In the preferred embodiments of the present invention, the mobile objects are robotic manipulators operating in a common workspace. The configuration settings are the manipulator joint angles and positions, which collectively define the position of the manipulator.

It will be appreciated from the foregoing that the present invention represents a significant advance in the field of path planning for multiple mobile devices operating in a common workspace, such as robotic manipulators. Path planning prior to the invention has been highly computation intensive for all but the simplest of configurations, and force field modeling for collision avoidance does not always provide satisfactory solutions. The present invention combines configuration space path planning on a relatively coarse scale with fine scale collision avoidance during the movement execution phase, thereby providing a convenient and practical solution to the multiple manipulator problem. Other aspects and advantages of the invention will become apparent from the following more detailed description, taken in conjunction with the accompanying drawings.

DESCRIPTION OF THE PREFERRED EMBODIMENTS

Figure 1:
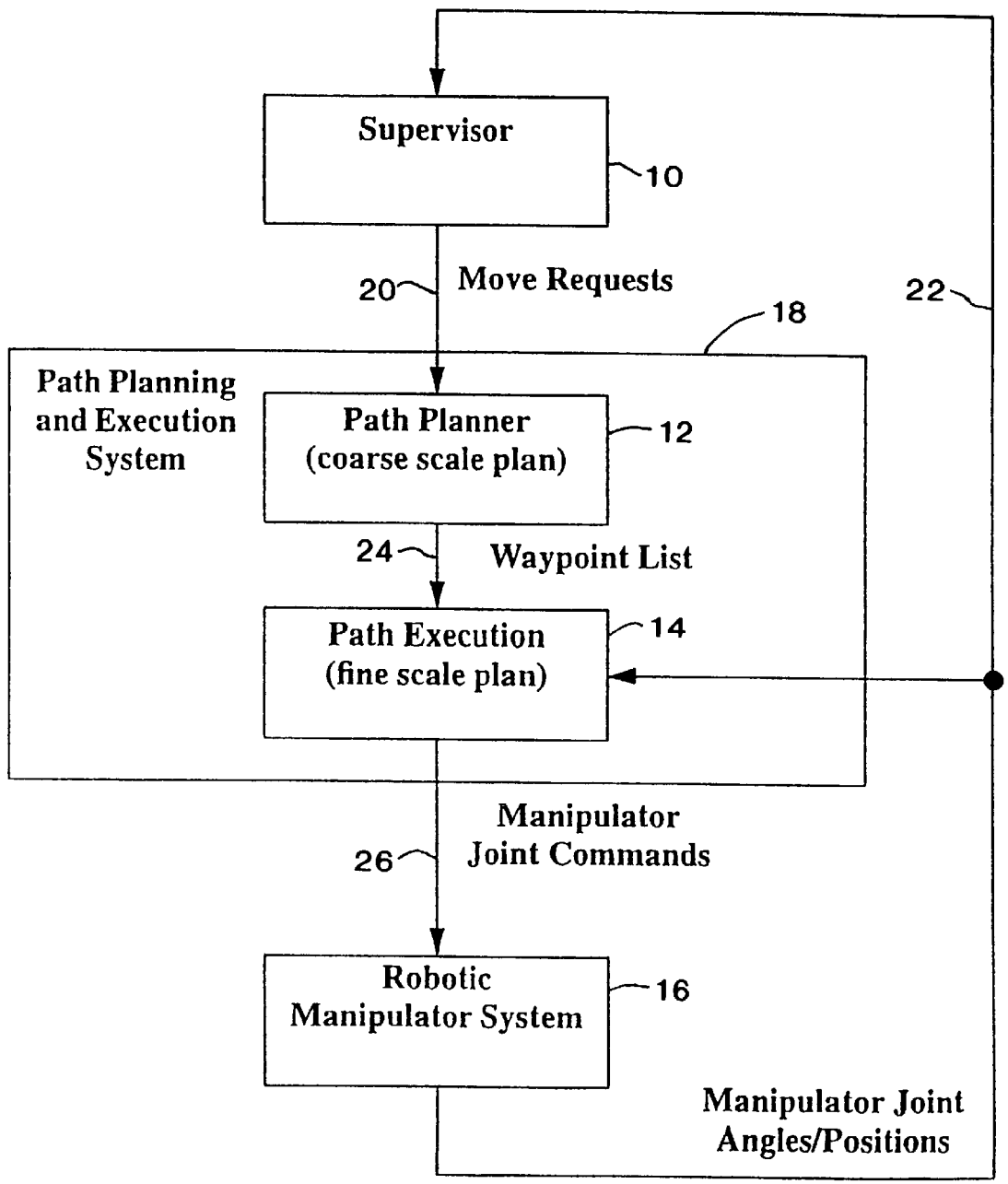
FIG. 1 is a top-level system configuration block diagram of the present invention.

As shown in the drawings for purposes of illustration, the present invention pertains to systems for planning and execution of collision free motion of multiple mobile objects, such as robotic manipulators, sharing a common work space. Although other systems have been proposed for this general purpose, none has proved to be completely satisfactory.

In accordance with the present invention, collision avoidance is achieved with a combination of global path planning on a coarse scale and fine scale execution of robotic manipulator motion. Global path planning of robot movements in configuration space, referred to as c-space, provides a nominal trajectory of movement between a current and a desired robot position. C-space is simply the space defined by a set of Cartesian axes, one for each degree of freedom of the robotic manipulator. Each axis scale measures the gimbal angle or joint position of one joint of the robotic manipulator. For example, a manipulator with a first arm hinged to a base and a second arm connected by another hinge joint to the first arm has two degrees of freedom and the c-space would be two-dimensional. Each point in c-space defines a specific position of the manipulator, and the coordinates of the point with respect to the c-space axes measure the gimbal angles corresponding to that position of the manipulator. Obstacles can be "mapped" into c-space, and then a desired movement of the manipulator can be planned taking the obstacles into account and producing a sequence of steps for moving the manipulator from one position to a desired position. In general, the fastest way to move from one position to another is represented by a straight line in c-space, but this path is not always possible because of the presence of fixed or dynamic obstacles.

Unfortunately, however, path planning based solely on c-space techniques is so computation intensive that it is an impractical approach for most systems of multiple manipulators. The present invention combines a c-space technique, for path planning on a relatively coarse scale, with a fine scale force field collision avoidance model. The resultant system avoids the disadvantages that each of these techniques has when used individually, and provides a practical system for motion planning and control of multiple mobile objects, such as robotic manipulators.

System Overview

As shown in FIG. 1, the system of the invention has four principal components: a supervisor, indicated by reference numeral 10, a coarse-scale path planning module 12, a fine-scale path execution module 14 and a robotic manipulator system 16. The coarse-scale path planning module 12 and the fine-scale path execution module 14 are together referred to as the path planning and execution system 18.

The supervisor 10 specifies a sequence of manipulator moves that together implement a useful task. The supervisor 10 sends move requests, as indicated by line 20, to the path planner 12, specifying the next required combination of manipulator positions and orientations. The supervisor 10 also receives, as indicated by line 22 from the manipulator system 16, the initial and current state of all the manipulator's gimbal angles and other parameters. As noted earlier, the manipulator system 16 consists of rigid links connected together by joints, many of which are revolute joints, similar to a simple hinge, having one degree of freedom. Other joint types include prismatic joints, which permit a sliding motion but no rotation, spherical joints, which allow angular motion in three dimensions, cylindrical joints, which permit both rotation and sliding movements, and screw joints, which produce link extension as a result of rotation. Regardless of the combination of types of joints in the manipulator system 16, its configuration at any instant is completely defined by a set of joint angles and positions.

The path planner 12 receives move requests from the supervisor 10 and produces a list of time tagged c-space "waypoints" for transmission to the path execution module 14, as indicated by line 24. The waypoint list is a set of combinations of joint angles/positions at specified times.

The path execution module 14 receives the waypoint list from the path planner 12, processes the list to determine the manipulator motion required to avoid collisions on a fine scale (of both angle/position and time), while following the coarse scale motion specified by the waypoint list, and sends time sampled joint commands to the manipulator system 16. The path execution module 14 may also receive the initial and updated state of the manipulator 16 over line 22, including all the joint axis angles and positions.

The robotic manipulator system 16 receives manipulator joint commands over line 26 from the path execution module 16, and executes these commands using conventional robotic manipulator components (not shown), such as manipulator joint controllers, and sensors to determine the current joint angles or positions. The manipulator system 16 may also incorporate the capability to perform combined position and force control, for precision operations such as part insertion, cutting, grinding, and so forth. A conventional robotic system includes a supervisor 10 and a manipulator system 16, so these components will not be described in detail in this specification.

Path Planning Module (12)

Figure 2:
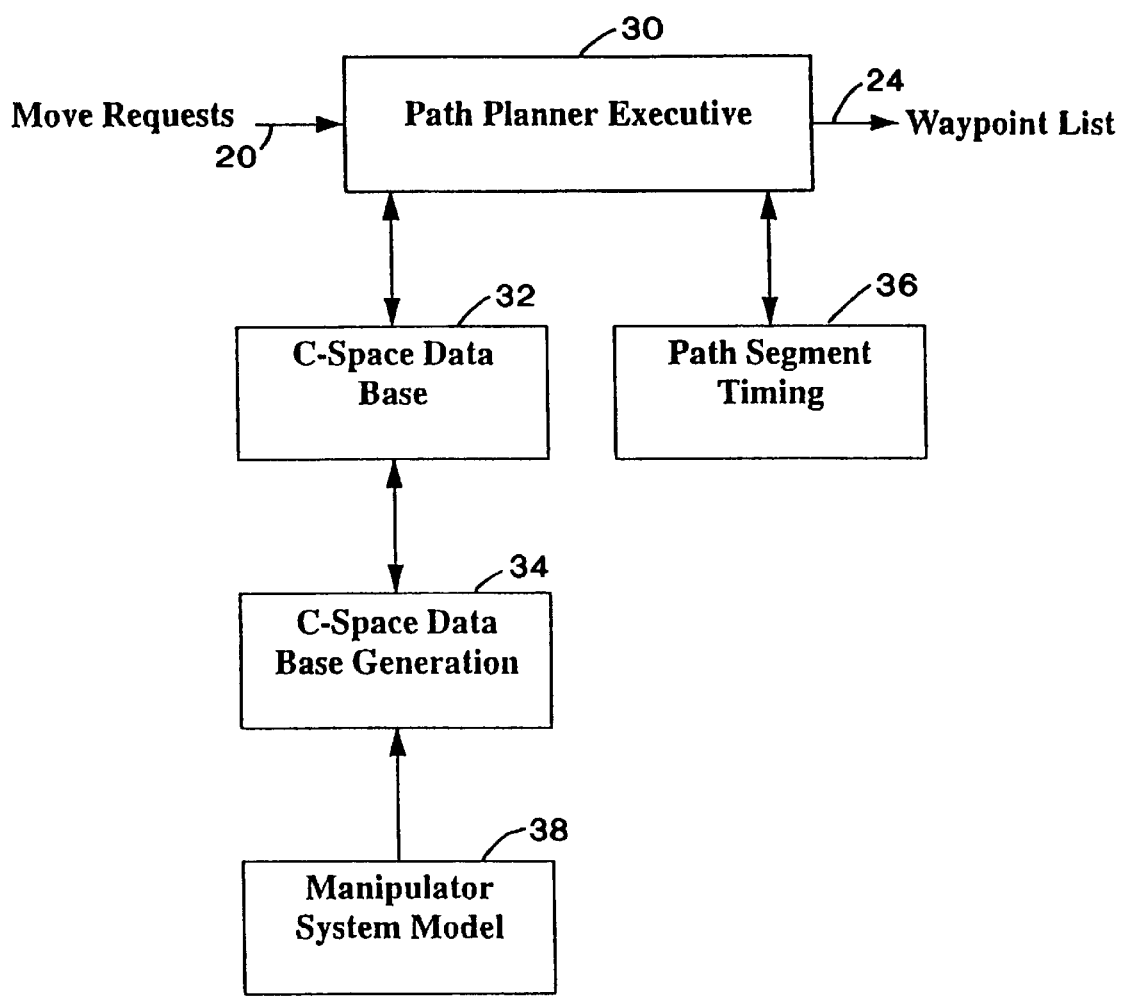
FIG. 2 is block diagram of the path planner used for coarse path planning in the present invention.

The path planning module 12 for producing a coarse scale path plan is shown in more detail in FIG. 2. It comprises five basic elements: a path planner executive 30, a c-space database 32, a c-space database generation module 34, a path segment timing module 36 and a manipulator system model 38.

The path planner executive 30 receives move requests on line 20, and determines a sequence of c-space path segments that avoid collisions, within the relatively coarse resolution of the c-space database 32. Each path segment is a straight line in c-space. The executive 30 also determines the timing for each path segment by querying the path segment timing module 36, and finally combines the end points of the path segments and the path segment timing to output a list of time-tagged waypoints on line 24.

The c-space database 32 allows the executive 30 to determine the cell type of each cell in c-space. A cell is, in general terms, a parallelepiped in c-space, bounded in each joint axis by discrete values of the joint variable. It will be recalled that c-space has as many dimensions as there are degrees of freedom in the manipulator system 16 (FIG. 1). For example, if there are only two degrees of freedom, the c-space is two-dimensional and each cell is simply a rectangular element of this two-dimensional space, bounded by discrete joint angles. If the two degrees of freedom correspond to revolute joints, the cells may, for example, be one degree (angular measurement) by one degree, or some other selected resolution. An important aspect of the c-space database is that it contains an indication for each cell as to whether the cell is "free," or "full" or "mixed." A free cell has no collisions for any combination of joint variables anywhere within its volume. That is to say the robotic manipulator system 16 can be moved to any point within the cell without colliding with a fixed or dynamic obstacle occupying the same cell of the c-space. A full cell indicates a potential collision for all combinations of joint variables within its volume. A mixed cell is one that is neither free nor full. The database 32 also incorporates joint limits for each of the manipulator joints. Each joint usually has a limited range of angular or translational motion. Cells containing joint variables that are beyond the specified limits are tagged as "full" in the database 32.

The c-space database generation module 34 contains the logic needed to determine the cell type of each c-space cell, to a specified level of joint variable resolution. This module may involve either off-line computation, on-line computation, or a combination of both. In particular, on-line computation may be used to determine the cell type of subregions of cells that have been determined to be of mixed type at the coarse level of resolution. This process is referred to as "cell explosion."

The manipulator system model 38 contains a mathematical description of the physical construction of the manipulator system 16, workpieces on which the system operates, and the work environment. The model may incorporate certain approximations to the physical dimensions of selected manipulator system components, either to reduce the size of the database or to provide a margin of safety to protect the components from potential collision. The model 38 is used by the c-space database generation module 34 to generate and update the c-space database 32.

The path segment timing module 36 performs path segment timing based on a family of parametric equations incorporating dynamic constraints of the joint variables. The constraints may be any combination of rate, acceleration, jerk, or higher temporal derivatives of the joint variables. The module 36 may incorporate either a set of mathematical equations relating the time required to change any manipulator joint variable by a specified amount under the dynamic constraints, or a look-up table containing equivalent data. This module 36 is queried by the path planner executive 30 and returns path segment time data to the executive.

Path Execution Module (14)

Figure 3:
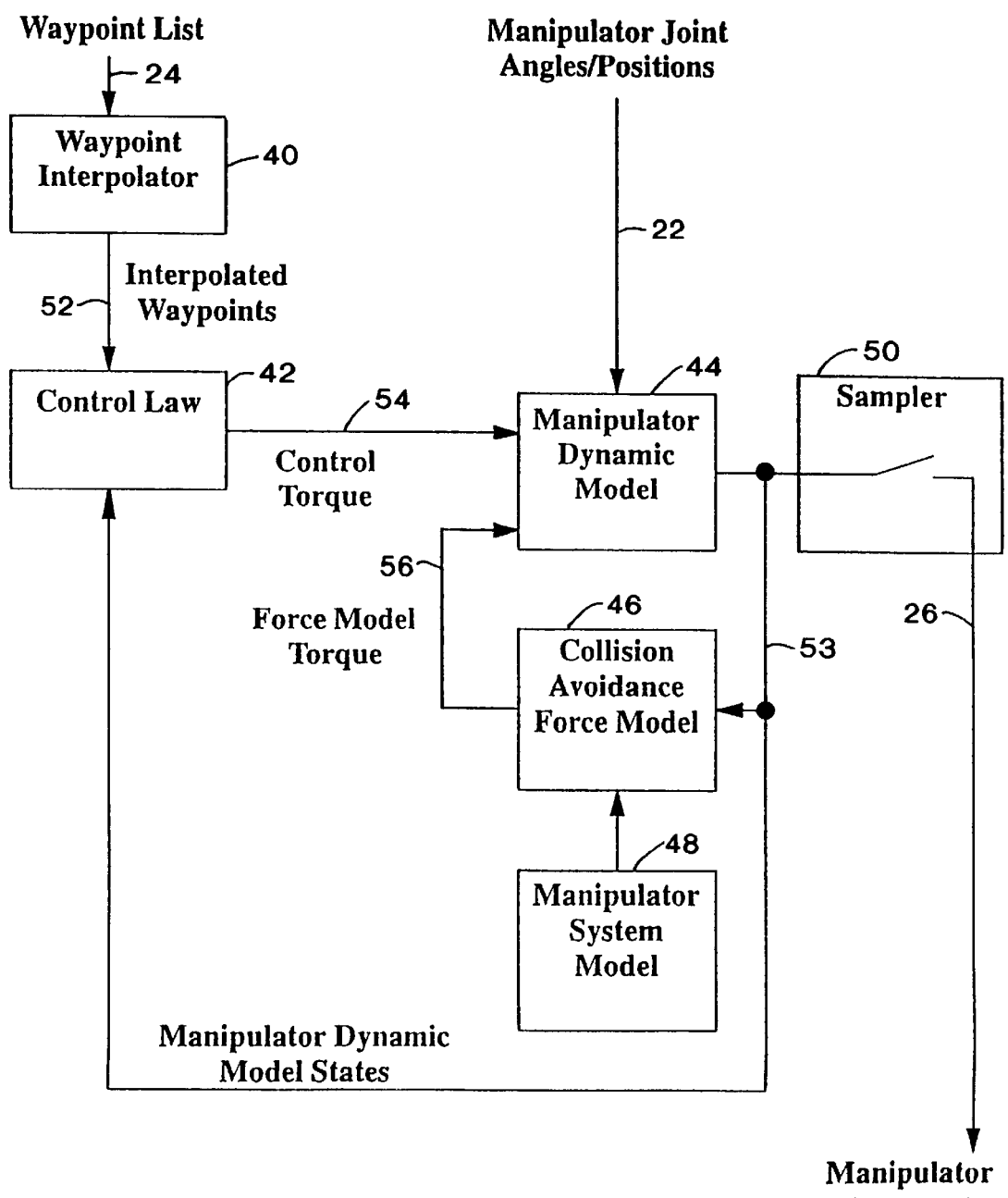
FIG. 3 is a block diagram showing path execution using a finer scale.

The path execution module 14 is shown in more detail in FIG. 3. It includes as components: a waypoint interpolator 40, a control law module 42, a manipulator dynamic model 44, a collision avoidance force model 46, a manipulator system model 48, and a sampler 50.

The waypoint interpolator 40 receives the time-tagged waypoint list from the path planner 12 over line 24 and determines any required combination of joint angle/position, rate, or acceleration (or higher temporal derivative) at a time resolution finer than the waypoint list, using the same set of parametric equations that were used to determine path segment timing in the path segment timing module 36. The coordination of the interpolator 40 with the path segment timing module 36 provides the capability to implement dynamic constraints on the nominal manipulator motion. The interpolator 40 provides interpolated waypoints to the control law module 42, as indicated by line 52.

The control law module 42 receives the interpolated waypoints from the interpolator 40 and also receives manipulator dynamic model state data from the manipulator dynamic model 44, over line 53. The control law module 42 processes both sets of input data through mathematical equations to produce control torque commands to the dynamic model 44, over line 54. The control law module 42 may incorporate both feedback and feedforward control terms. The feedback control terms are based on the manipulator dynamic model states or the difference between the interpolated waypoints and the manipulator dynamic model states. The feedforward control terms are based only on the interpolated waypoints. The purpose of the feedback control terms in the control law is to stabilize and modify the dynamic behavior of the combination of the manipulator dynamic model 44 and the collision avoidance force model 46. The feedback terms in the control law may include proportional, rate, lag, integral, or any other form of control compensation. The purpose of the feedforward terms in the control law is to provide a nominal control torque that, in the absence of the collision avoidance model 46, would move the manipulator system along the trajectory implied by the interpolated waypoints. The control law may include non-linear terms or mode-switching, e.g., adding an integral term when the control errors are small.

The manipulator dynamic model 44 includes a set of mathematical equations implementing a real time solution of the motion of the manipulator system under the combined influence of the control torques received from the control law module 42, over line 54, and force model torques received from the collision avoidance model 46, over line 56. The measured manipulator joint angles/positions from the actual manipulator system 16 (FIG. 1) may be used to initialize or update the states of the manipulator dynamic model 44. Joint variable (angle and position) limits are included in the mathematical equations. The dynamic model 44 outputs, on line 53, the manipulator dynamic model states, such as joint angles/positions, rates, and accelerations. The level of fidelity of the dynamic equations used in the model 44 may range from full nonlinear coupled equations to simplified and idealized equations, depending on the accuracy required.

The collision avoidance force model 46 incorporates forward kinematic equations relating the manipulator dynamic model joint variable states, from the dynamic model 44, to the relative location of manipulator components in the workspace. The model 46 also incorporates mathematical equations relating the relative position of manipulator components in the workspace to hypothetical forces of repulsion between these components, and mathematical equations relating the hypothetical forces of repulsion between components to resultant forces and moments on the manipulator system, to send back to the dynamic model 44 over line 56. The mathematical equations incorporate the manipulator system model 48.

The hypothetical repulsion force equations may incorporate finite element approximations. Forms of the hypothetical repulsion force equation may include the term "$1/r^2$" (where r is the distance between potentially colliding components), exponential decay with distance, Gaussian decay with distance, or any other monotonically decreasing function of relative distance. The hypothetical repulsion force equations may incorporate an option to make the repulsion force of selected manipulator components unilateral, so as to provide priority in deviating the path of selected manipulators to avoid collision. Thus, a low priority manipulator would "yield" to a higher priority manipulator to avoid a collision.

The manipulator system model 48 has content and scope similar to the system model 38 (FIG. 2). However, since this model 48 supports a finer scale of motion planning, the model needs to be at least as accurate and detailed as the model 38.

Hardware Implementation

Figure 4:
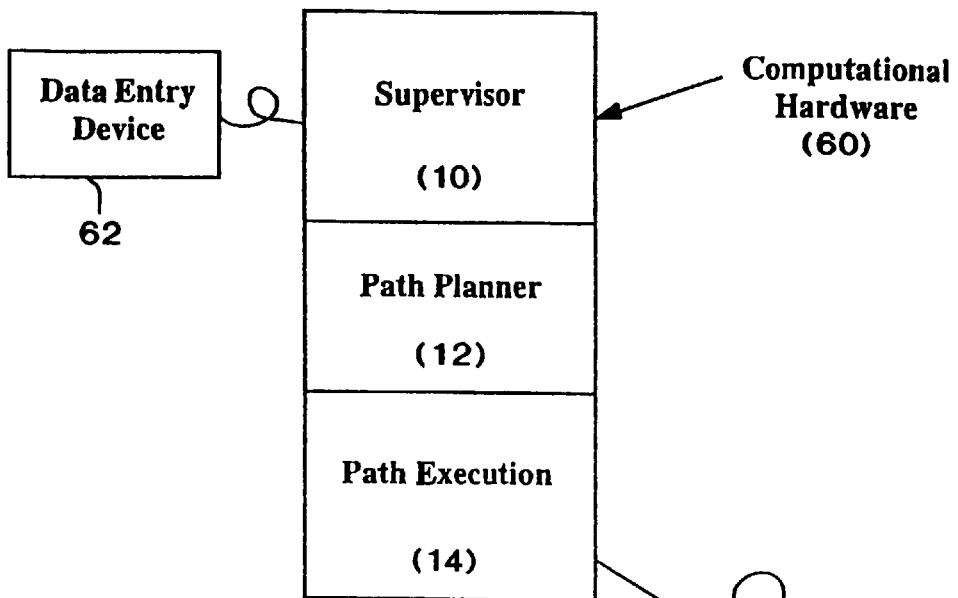
FIG. 4 is a block diagram showing a hardware implementation of the present invention in relation to an illustrative robotic manipulator system.
Figure 4:
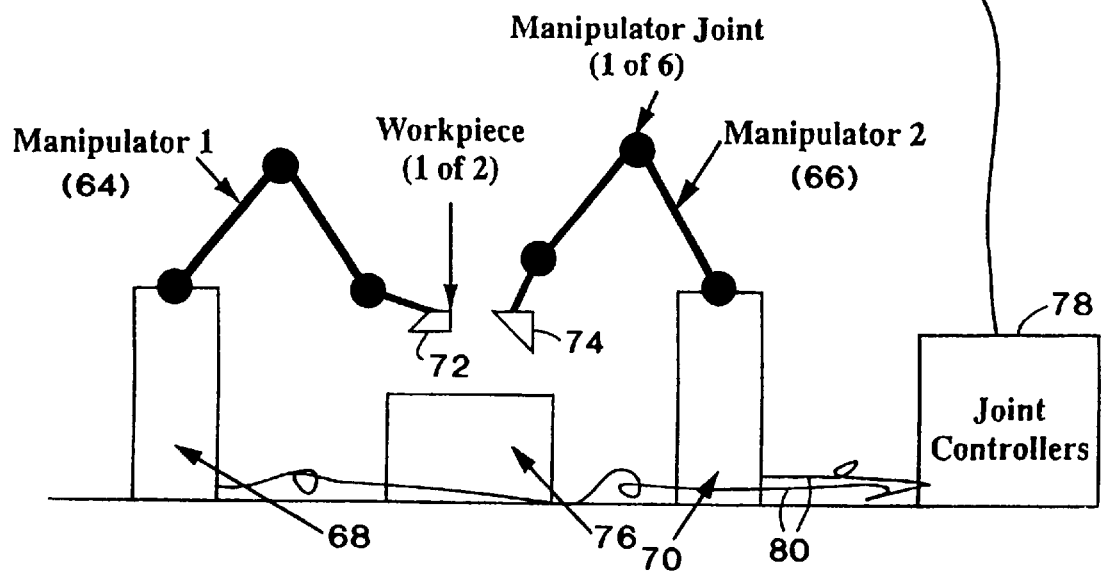

FIG. 4 is an example of a hardware implementation of the invention. Computational hardware 60, includes supervisor 10, path planner 12 and path execution 14 modules. The computation hardware also includes an associated data entry device 62 and other conventional computational components (not shown). The illustrative robotic manipulator system 16 includes a first manipulator 64 and a second manipulator 66, each with three joints, shown as solid circles, and three links, shown as thick straight lines. The manipulators 64 and 66 are mounted on bases 68 and 70, respectively, and are shown as holding workpieces 72 and 74, respectively, to be integrated with a unit 76 under assembly by the robotic manipulator system. The computational hardware 60 provides manipulator commands over line 26 to a set of joint controllers 78, which, in turn, provides control signals over lines 80 to the manipulators 64 and 66.

More Detail of Path Planner Executive (30)

Figure 5:
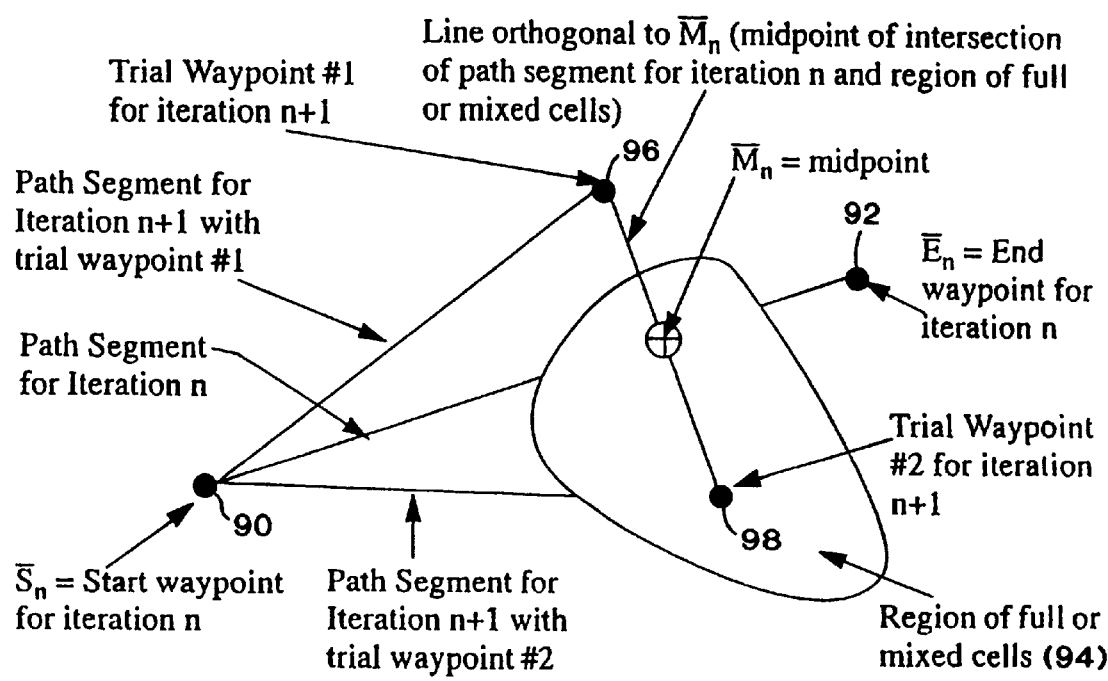
FIG. 5 is a diagram illustrating a path finding iteration in two-dimensions configuration space.

Motion planning using the c-space method uses an iterative approach. In each iteration, as shown in FIG. 5, the path is scanned from the current waypoint 90 to the next waypoint 92 and the cell type (i.e., whether empty, full, or mixed) is determined for each cell that would be traversed by following this direct path in c-space. The shaded area 94 indicates a region of full or mixed cells, some which would be traversed by the direct path, resulting in a possible collision. When this situation is detected, one or more additional waypoints must be found to avoid the collision. A critical step in this procedure is the generation of candidate or trial waypoints for the next iteration of the path planning process. Trial waypoint #1, indicated at 96, avoids the collision because it falls outside the region 94. Trial waypoint #2, indicated at 98, does not. The probability of efficiently finding a collision-free path depends on a method that generates trial waypoints that are both orthogonal to the original path and in a variety of directions.

Figure 6:
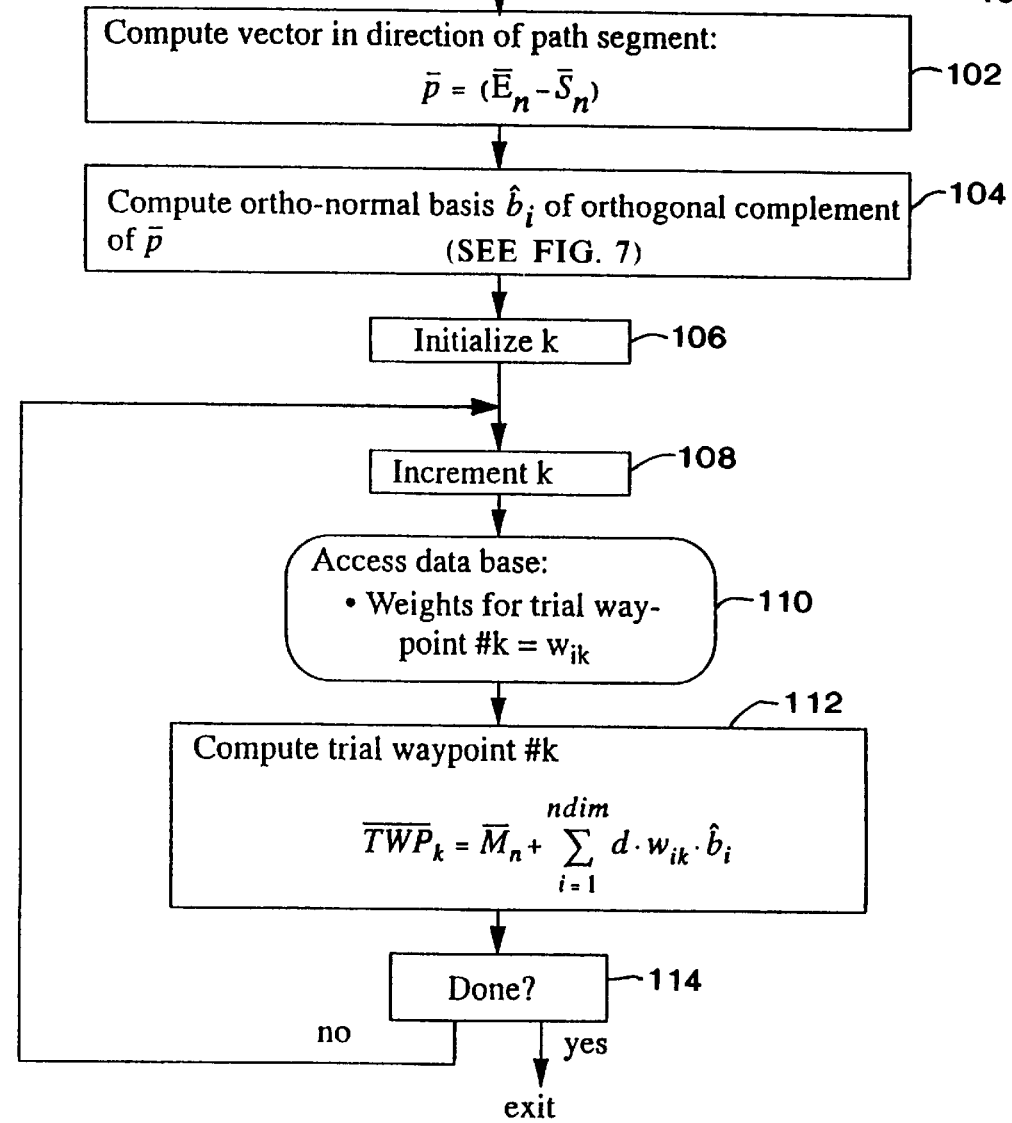
FIG. 6 is a flowchart depicting a method of generating trial waypoints in configuration space of arbitrary dimension, in accordance with one aspect of the invention.

Prior to the present invention, algorithms for trial waypoint generation have existed for only two- or three-dimensional c-spaces, where geometrical reasoning is adequate. As most potential applications require path planning in higher dimensional c-spaces, typically five to fourteen dimensions, a more general method is required. Such a method is depicted in FIG. 6.

The method generates trial waypoints that are both orthogonal to the original path segment and span all available directions. In the general case, the start waypoint, indicated by $\overline{S}_n$, and the end waypoint, indicated by $\overline{E}_n$, are vectors having j elements, where j is the dimensionality of the c-space. The midpoint of the direct path segment with respect to the edges of the region 94, is designated by another vector $\overline{M}_n$, which also has j elements. Block 100 of FIG. 6 shows the definitions of these three vector quantities, which are inputs to the method.

As shown in block 102, the next step is to compute a vector $\overline{p}$ that defines the path segment, i.e. $\overline{p} = \overline{E}_n - \overline{S}_n$.

Two cases are possible:

1) all j elements of $\overline{E}_n - \overline{S}_n$ are zero, or
2) at least one element of $\overline{E}_n - \overline{S}_n$ is non-zero.

Figure 7:
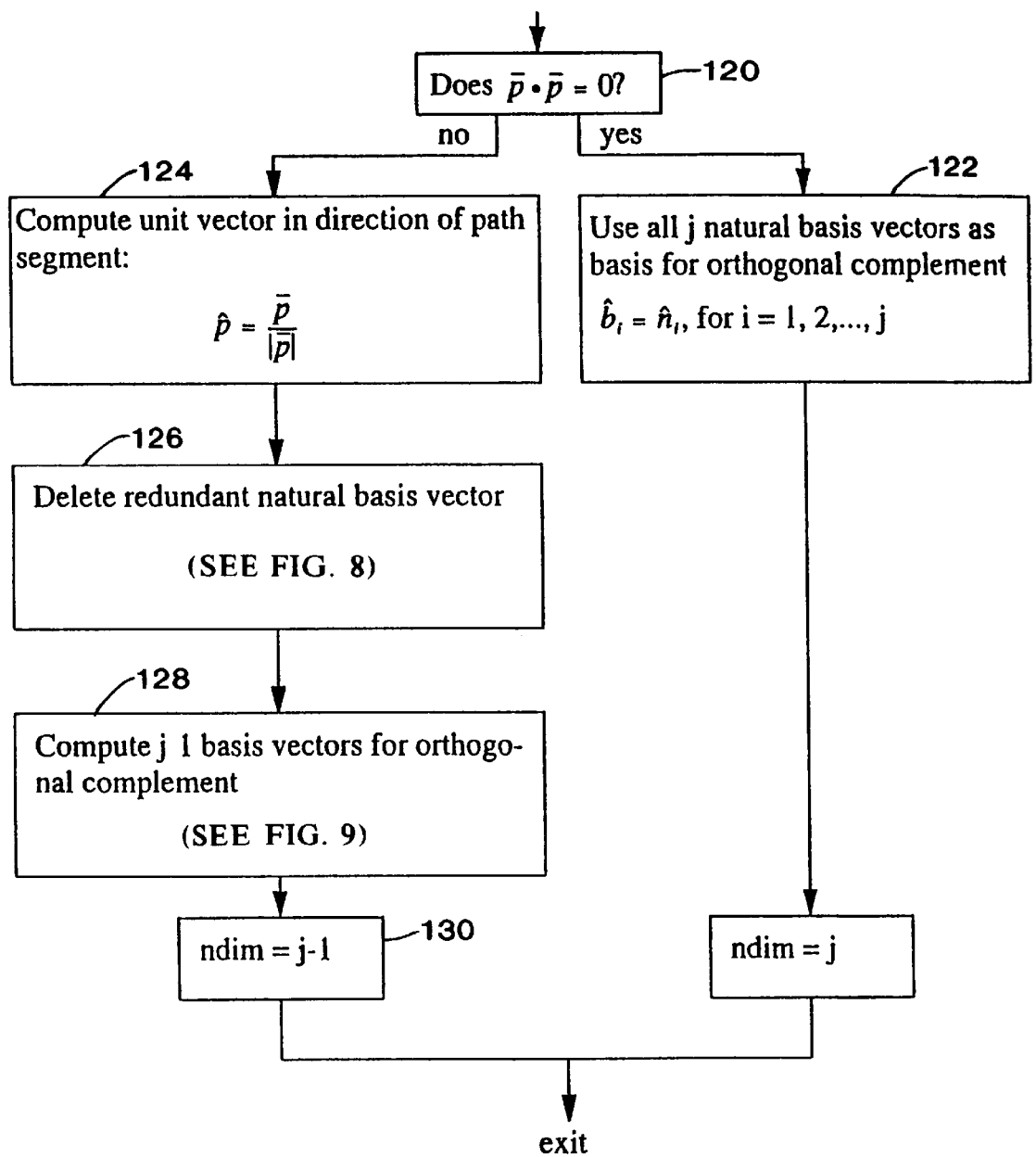
FIG. 7 is a flowchart depicting a method for implementing one of the blocks (104) in the flowchart of FIG. 6.

The next step, shown in block 104, is to compute an ortho-normal basis $\hat{b}_i$, of the orthogonal complement of $\overline{p}$. In the first case, $\overline{p}$ has dimension zero and the basis $\overline{b}$hd i, (i=1,2, ... ,j) of the orthogonal complement can be chosen as any j-dimensional complete ortho-normal basis. In practice, the simplest choice is the natural basis, that is, by setting $b_1 = n_1 = (1,0,0, \ldots)$, and $b_2 = n_2 = (0,1,0, \ldots)$ and $b_j = n_j = (0,0, \ldots, 1)$. In the second case above, one of the natural basis vectors is redundant and must be deleted before proceeding. The procedure for generating the orthogonal complement basis vectors is illustrated in FIG. 7, with further details provided in FIGS. 8 and 9.

The next steps in the process of determining trial waypoints is to initialize and increment a counter k, as shown in blocks 106 and 108, respectively. Then a database is accessed to obtain weights $w_{ik}$ for each trial waypoint k, as indicated in block 110. The weights can be selected in a variety of ways. For example, letting the $w_i = -1$ or $+1$ in all possible $2^{j-1}$ combinations produces trial waypoints on the vertices of a hyper-cube. As a second example, selecting the $w_i$ such that $$\sum_{i=1}^{j-1} (w_i)^2 = 1$$

results in having trial waypoints on the surface of a hyper-sphere in the subspace orthogonal to the current path segment. In this case, the weights can be either deterministically or randomly selected to insure diversity in the direction to the trial waypoints.

Then, as shown in block 112, each trial waypoint is computed from the expression $$\overline{TWP_k} = \overline{M_n} + \sum_{i=1}^{ndim} d \cdot w_{ik} \cdot \hat{b}_i$$

where d is a parameter determining the distance of the trial waypoints from $\overline{M}_n$.

Finally, in block 114, the k counter is checked to determine if all the trial waypoints have been computed, before exit from this processing module.

Figure 8:
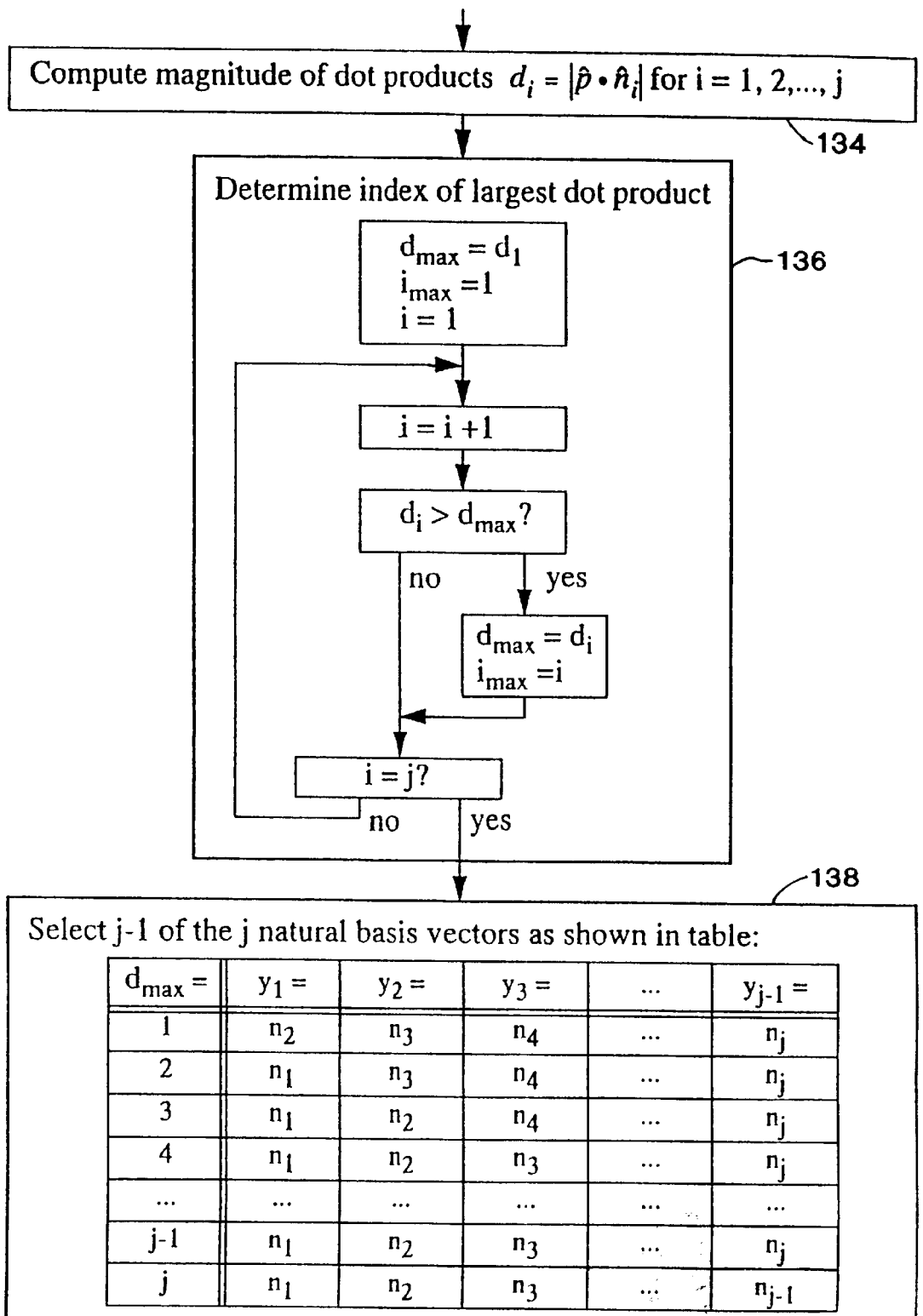
FIG. 8. is a flowchart depicting a method for implementing one of the blocks (126) of the flowchart of FIG. 7.
Figure 9:
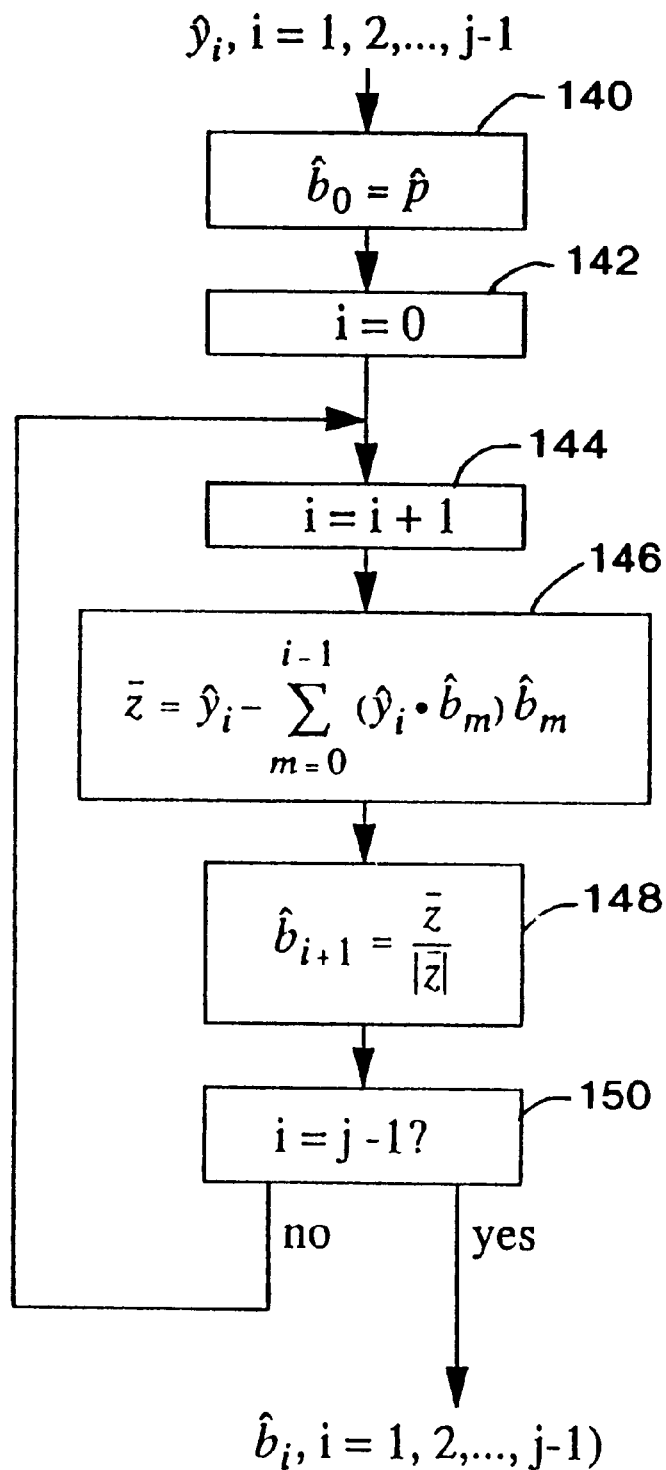
FIG. 9 is a flowchart depicting a method for implementing another of the blocks (128) of FIG. 7.

The detailed method for computing the ortho-normal basis $\hat{b}_i$ of the orthogonal complement of $\overline{p}$ is shown in FIG. 7. Block 120 indicates the categorization of $\overline{p}$ into one of two possibilities. If $\overline{p} \cdot \overline{p} = 0$, all j natural basis vectors are used as a basis for the orthogonal complement, i.e., $\hat{b}_i = \hat{n}_i$, for i=1,2, ..., j, as indicated in block 122. If $\overline{p} \cdot \overline{p} \neq 0$, the steps performed are, first, to compute the unit vector in the direction of the path segment, as indicated in block 124, from the expression $$\hat{p} = \frac{\overline{p}}{|\overline{p}|},$$

then to delete the redundant natural basis vector, as indicated in block 126 and further illustrated in FIG. 8, then to compute j−1 basis vectors for the orthogonal complement, as indicated in block 128 and further illustrated in FIG. 9. Finally the number of dimensions ndim is set to j−1 to account for deletion of one vector in block 126, as indicated in block 130. If all j natural basis vectors are used, ndim is set to j, as indicated in block 132.

FIG. 8 is an expansion of block 126 of FIG. 7. The first step for deleting a redundant natural basis vector is to compute the magnitude of a set of vector dot products: $d_i = |\hat{p} \cdot \hat{n}_i|$ for I=1, 2, ..., j, as indicated in block 134. Then, in block 136, the next step is to determine the index of the largest of the dot products computed in the previous block. As detailed in the flowchart within block 136, this is simply a matter of comparing successive values of the dot product with a current maximum value, which is initialized to $d_1$. If any dot product is found to be greater than the current maximum, a new maximum is declared. When all j dot products have been compared in this way, the current maximum is the maximum of all the dot products, and the index $i_{max}$ associated with the maximum is known. Finally, j−1 of the natural basis vectors are selected, omitting the natural basis vector with the index $i_{max}$. For convenience, the sets of j−1 vectors may be selected from a table, as shown in block 138.

FIG. 9 is an expansion of block 128 in FIG. 7, in which j−1 basis vectors are computed for the orthogonal complement. Input to the process are the j−1 natural basis vectors, $\hat{y}_i$, for i=1, 2, ..., j−1. For notational convenience the zero basis vector is equated with the path segment vector, $\hat{b}_o = \hat{p}$, as indicated in block 140. The subscript i is initially set to zero, in block 142, and is incremented by one, in block 144. For each value of i, an intermediate vector z is calculated, block 146, from:

$$\overline{z} = \hat{y}_i - \sum_{m=0}^{j-1} (\hat{y}_i \cdot \hat{b}_m) \hat{b}_m.$$

The basis vector is obtained by normalizing the z vector length to unity, as shown in block 148, using the expression:

$$\hat{b}_{i+1} = \frac{\overline{z}}{|\overline{z}|}.$$

In block 150, the value of i is checked to determine if all j−1 basis vectors have been obtained. If so, the task is completed, with the solution $\hat{b}_i$, for i=1, 2, ..., j−1.

Extension to Partially Predetermined Motion

For cases where it is desired to insert the waypoint without changing the previously planned motion in certain dimensions, the method can be modified as described in this section.

From the definition of a trial waypoint k in FIG. 6, the required constraint equation for each element m that is constrained to follow a predetermined motion is:

$$\left( \sum_{i=1}^{ndim} d \cdot w_{ik} \cdot \hat{b}_i \right)_m = 0$$

For the case ndim=j, $\hat{b}_i$, has a 1 in the $i^{th}$ position and zero elsewhere. The above condition can then be met simply by setting $W_{mk}=0$ for each value m corresponding to an axis constrained to follow a predetermined motion. The remaining weights can be selected as before.

For the case ndim=j−1, $\hat{b}_i$ may have any element non-zero and a more general approach, based on linear algebra, is needed. As an example, consider a case of a six-dimensional c-space with at least one element of $\overline{E}_n - \overline{S}_n$ non-zero and for which motion along the first three dimensions is not to be modified by waypoints. For this case:

j=6, ndim=5 and $m_1=1, m_2=2, m_3=3$.

In matrix form, the three resulting constraint equations reduce to:

$$\begin{bmatrix} b_{11} & b_{21} & b_{31} & b_{41} & b_{51} \\ b_{12} & b_{22} & b_{32} & b_{42} & b_{52} \\ b_{13} & b_{23} & b_{33} & b_{43} & b_{53} \end{bmatrix} \cdot \begin{bmatrix} w_{1k} \\ w_{2k} \\ w_{3k} \\ w_{4k} \\ w_{5k} \end{bmatrix} = \begin{bmatrix} 0 \\ 0 \\ 0 \end{bmatrix},$$

where $b_{ij}$ is element j of basis vector i. This is an underdetermined system of equations with three equations (each row) in five unknowns (the $w_{ik}$ for i=1,2,3,4,5) and can be solved for three of the $w_{ik}$ in terms of the other two, by partitioning, transposing and inverting. The resulting solution gives the three dependent weights in terms of the two independent weights.

In particular, one possible solution is:

$$W_{123k} = \begin{bmatrix} w_{1k} \\ w_{2k} \\ w_{3k} \end{bmatrix} = - \begin{bmatrix} b_{11} & b_{21} & b_{31} \\ b_{12} & b_{22} & b_{32} \\ b_{13} & b_{23} & b_{33} \end{bmatrix}^{-1} \cdot \begin{bmatrix} b_{41} & b_{51} \\ b_{42} & b_{52} \\ b_{43} & b_{53} \end{bmatrix} \cdot \begin{bmatrix} w_{4k} \\ w_{5k} \end{bmatrix}$$

$$= B_{123}^{-1} \cdot B_{45} \cdot W_{45k} = \begin{bmatrix} g_{14} & g_{15} \\ g_{24} & g_{25} \\ g_{34} & g_{35} \end{bmatrix} \cdot W_{45k} = G_{45} \cdot W_{45k}.$$

Here the elements of $W_{45k}$ ($W_{4k}$ and $W_{5k}$) are independent weights (free parameters) and the elements of $W_{123k}$ ($W_{1k}$, $W_{2k}$, and $W_{3k}$) are defined in terms of $W_{4k}$ and $W_{5k}$. The $g_{ij}$ are the factors relating dependent weight $W_{ik}$ to independent weight $W_{jk}$ and are defined by the indicated matrix operations in the above equation. Of course, the 3×3 matrix $B_{123}$ must be invertible; if it is not, another choice of independent variable should be tried. Because the basis vectors are linearly independent, at least one of the ten possible choices (tabulated below) of independent weights will result in an invertible matrix. The choice that gives the largest determinant of the 3×3 matrix will have the best numerical behavior.

| Independent Weights | | Dependent Weights | | |
|---|---|---|---|---|
| 1 | 2 | 3 | 4 | 5 |
| 1 | 3 | 2 | 4 | 5 |
| 1 | 4 | 2 | 3 | 5 |
| 1 | 5 | 2 | 3 | 4 |
| 2 | 3 | 1 | 4 | 5 |
| 2 | 4 | 1 | 3 | 5 |
| 2 | 5 | 1 | 3 | 4 |
| 3 | 4 | 1 | 2 | 5 |
| 3 | 5 | 1 | 2 | 4 |
| 4 | 5 | 1 | 2 | 3 |

The result is two parameter family of trial waypoints that are orthogonal to the path segment and do not involve any deviations to the predetermined path along 1-,2- or 3 axis c-space. Written out in expanded form, trial waypoint k is defined by:

$$\overline{TWP}_k = \bar{M}_n + d \cdot \{(g_{14} \cdot w_{4k} + g_{15} \cdot w_{5k}) \cdot \hat{b}_1 + (g_{24} \cdot w_{4k} + g_{25} \cdot w_{5k}) \cdot$$

$$\hat{b}_2 + (g_{34} \cdot w_{4k} + g_{35} \cdot w_{5k}) \cdot \hat{b}_3 + w_{4k} \hat{b}_4 + w_{5k} \hat{b}_5\}$$

By varying $w_4$ and $w_5$, trial waypoints can be generated anywhere in the plane that is perpendicular to the path vector and that does not involve any deviations to the predetermined path along the 1-, 2- or 3-axis of the c-space.

Conclusion

It will be appreciated from the foregoing description that the present invention resents a significant advance in the control of multiple robotic mechanisms and the principles of the inventions also apply to other fields in which the path of mobile objects must be controlled in such a way as to avoid collisions. In particular, the invention provides a novel combination of c-space path planning, for coarse planning of the path of each object, and artificial force field execution at a finer level of resolution. The combination avoids the problems that each of these approaches has presented prior to the invention. Other aspects of the invention pertain to improvements in c-space path planning, and in particular to an iterative c-space technique for planning a path through a workspace with only moderate computational requirements. It will also be appreciated that, although a specific embodiment of the invention has been described for purposes of illustration, various modifications may be made without departing from the spirit and scope of the invention. Accordingly, the invention should not be limited except as by the appended claims.

What is claimed is:

1. A system for controlling the movements of multiple mobile objects through a workspace, wherein the position of each object is dependent on the configuration of a plurality of interconnected linkages, as defined by a plurality, n, of configuration settings corresponding to n degrees of freedom of the object, the system comprising:

a path planner for planning in advance a series of movements of each of the mobile objects to provide a relatively coarse scale plan for the movements, wherein the path planner determines paths in a configuration space defined by n orthogonal axes corresponding to n configuration settings that define the position of each object in three-dimensional space; and a path execution module operable to move the objects in accordance with the relatively coarse scale plan provided by the path planner, and including a fine-scale artificial force field collision avoidance subsystem, to provide control signals to the movable objects such that they are moved along paths determined in part by the path planner and in part by the collision avoidance subsystem, whereby the objects are moved from starting points to desired endpoints without collisions with each other or with any stationary obstacles, and wherein the path execution module includes a waypoint interpolator, to generate finer resolution paths from path data provided by the path planner.

a control law module for generating control signals based on the finer resolution path through configuration space and predicted configuration setting of the object, a collision avoidance force model, for generating collision avoidance control signals based on mutual proximity of the objects in the workplace, and means for combining the collision avoidance control signals and the control signals from the control law module, wherein collision avoidance is achieved on a fine scale by modifying the paths planed through the configuration space.

2. A system as defined in claim 1, wherein the path planner includes:

a configuration-space database defining the workspace as multiple n-dimensional cells;

database generation logic, for determining a collision status for each cell of the configuration-space database, wherein the collision status is either "full," indicating that there is a potential for collision for all combinations of configuration settings within the cell, or "free," indicating that there is no potential for collision in the cell, or "mixed," indicating that there is potential for collision for some combinations of configuration settings within the cell; and a path planning executive module using information about each cell of the configuration-space database, to plan a path from one point in configuration space to another, in such a manner that collisions are avoided.

3. A system as defined in claim 2, wherein the path planner further includes:

a path segment timing module, for generating time data for the path planning executive module, based on given dynamic constraints to be applied to joint variables.

4. A system as defined in claim 3, wherein the waypoint interpolator includes a path segment timing module, for generating time data to be used in planning the interpolated path, based on given dynamic constraints to be applied to joint variables.

5. A system as defined in claim 2, wherein the path planning executive module further includes:

means for selecting a first trial path and determining whether the path passes through any full or mixed cells; and means for systematically selecting a second and other trial paths, if the earlier selected trial paths are subject to collision, wherein a collision-free path is ultimately selected.

6. A system as defined in claim 5, wherein the means for systematically selecting a second and other trial paths includes:

means for detecting a midpoint in a portion of the trial path that passes through a collision region of full or mixed cells; and means for selecting a trial waypoint located on a line through the midpoint and orthogonal to the trial path that passes through the midpoint, wherein the trial waypoint is selected to be on the planned path if the trial waypoint is not in the collision region.

7. A system as defined in claim 1, wherein the path execution module includes:

an object dynamic model, for providing estimates of object configuration settings for use by the control law module and the collision avoidance force model.

8. A system for controlling the movements of multiple robotic manipulators through a workspace, wherein the position of each manipulator is dependent on the configuration of a plurality of interconnected linkages, as defined by a plurality, n, of configuration joint settings corresponding to n degrees of freedom of the manipulator, the system comprising:

a path planner for planning in advance a series of movements of each of a plurality robotic manipulators to provide a relatively coarse scale plan for the movements, wherein the path planner determines paths in a configuration space defined by n orthogonal axes corresponding to n configuration joint settings that define the position of each manipulator in three-dimensional space; and a path execution module operable to move the manipulators in accordance with the relatively coarse scale plan provided by the path planner, and including a fine-scale artificial force field collision avoidance subsystem, to provide control signals to the manipulators such that they are moved along paths determined in part by the path planner and in part by the collision avoidance subsystem, whereby the manipulators are moved from starting points to desired endpoints without collisions with each other or with any stationary obstacles, and wherein the path execution module includes
a waypoint interpolator, to generate finer resolution paths from path data provided by the path planner,
a control law module for generating control signals based on the finer resolution paths through configuration space and predicted states of the manipulators;
a collision avoidance force model, for generating collision avoidance control signals based on mutual proximity of the manipulators and any other objects in the workspace, and
means for combining the collision avoidance control signals and the control signals from the control law module, wherein collision avoidance is achieved by modifying the paths planned through the configuration space.

9. A system as defined in claim 8, wherein the path planner includes:

a configuration-database defining the workplace as multiple n-dimensional cells;

database generation logic, for determining a collision status for each cell of the configuration-space database, wherein the collision status is either "full," indicating that there is a potential for collision for all combinations of configuration joint settings within the cell, or "free," indicating that there is no potential for collision in the cell, or "mixed," indicating that there is potential for collision for some combinations of configuration joint settings within the cell; and a path planning executive module using information about each cell of the configuration-space database, to plan a path from one point in configuration space to another, in such a manner that collisions are avoided.

10. A system as defined in claim 9, wherein the path planner further includes:

a path segment timing module, for generating time data for the path planning executive module, based on given dynamic constraints to be applied to joint variables.

11. A system as defined in claim 10, wherein the waypoint interpolator includes a path segment timing module, for generating time data to be used in planning the interpolated path, based on given dynamic constraints to be applied to joint variables.

12. A system as defined in claim 9, wherein the path planning executive module further includes:

means for selecting a first trial path and determining whether the path passes through any full or mixed cells; and means for systematically selecting a second and other trial paths, if the earlier selected trial paths are subject to collision, wherein the a collision-free path is ultimately selected.

13. A system as defined in claim 12, wherein the means for systematically selecting a second and other trial paths includes:

means for detecting a midpoint in a portion of the trial path that passes through a collision region of full or mixed cells; and means for selecting a trial waypoint located on a line through the midpoint and orthogonal to the trial path that passes through the midpoint, wherein the trial waypoint is selected to be on the planned path if the trial waypoint is not in the collision region.

14. A system as defined in claim 8, wherein the path execution module further includes:

a manipulator dynamic model, for providing estimates of manipulator configuration joint settings for use by the control law module and the collision avoidance force model.

15. A method for planning and executing movements of multiple mobile objects through a workspace, wherein the position of each object is dependent on the configuration of a plurality of interconnected linkages, as defined by a plurality, n, of configuration settings corresponding to n degrees of freedom of the object, the method comprising the steps of:

planning in advance a path having series of movements of each of the mobile objects to provide a relatively coarse scale plan for the movements, wherein the planning step determines paths in a configuration space defined by n orthogonal axes corresponding to n configuration settings that define the position of each object in three-dimensional space;

controlling the path execution in such a way as to move the objects primarily in accordance with the relatively coarse scale plan provided by the planning step, and including an additional step of generating collision avoidance object control signals based on an artificial force field model, wherein the step of controlling the path execution movement includes
interpolating between coarse path planning waypoints to generate finer resolution planned paths,
generating control signals based on the finer resolutions paths through configuration space and predicted configuration settings of the objects, generating collision avoidance control signals based on mutual proximity of objects in the workspace, and combining collision avoidance control signals and the control signals based on the finer resolution planned path, wherein collision avoidance is achieved by modifying the paths planned through the configuration space; and applying control signals to the movable objects such that they are moved along paths determined in part by the path planning step and in part by the step of controlling the path execution, whereby the objects are moved from starting points to desired endpoints without collision with each other or with any stationary obstacles.

16. A method as defined in claim 15, wherein the path planning step includes:

setting up a configuration-space database defining the workspace as multiple n-dimensional cells;

determining a collision status for each cell of the configuration space database, wherein the collision status is either "full," indicating that there is a potential for collision for all combinations of configuration settings within the cell, or "free," indicating that there is no potential for collision in the cell, or "mixed," indicating that there is potential for collision for some combinations of configuration settings within the cell; and generating a coarse path plan using information about each cell of the configuration-space database, to provide for movement in a path from one point in configuration space to another in such a manner that collisions are avoided.

17. A method as defined in claim 16, wherein the step of generating a coarse path includes:

generating time data for multiple segments of the coarse path, based on given dynamic contraints to be applied to joint variables.

18. A method as defined in claim 17, wherein the interpolating step includes generating time data to be used in planning the interpolating path, based on dynamic constraints to be applied to joint variables.

19. A method as defined in claim 18, wherein the step of generating a coarse path plan includes:

selecting a first trial path and determining whether the path passes through any full or mixed cells; and systematically selecting a second and other trial paths, if the earlier selected trial paths are subject to collision, wherein a collision-free path is ultimately selected.

20. A method as defined in claim 21, wherein the step of systematically selecting a second and other trial paths includes:

detecting a midpoint in a portion of the trial path that passes through a collision region of full or mixed cells; and selecting a trial waypoint located on a line through the midpoint and orthogonal to the trial path that passes through the midpoint, wherein the trial waypoint is selected as being on the planned path if the trial waypoint is not in the collision region.

21. A method as defined in claim 15, wherein the steps of controlling the path execution further includes;

dynamic modeling movement of the objects, to provide estimates of object configuration settings for use in the step of generating control signals based on the finer resolution paths and in the step of generating collision avoidance control signals.

22. A method for planning and executing movements of multiple robotic manipulators through a workspace, wherein the position of each manipulator is dependent on the configuration of a plurality of interconnected linkages, as defined by a plurality, n, of configuration joint settings corresponding to n degrees freedom of the manipulator, the method comprising the steps of:

planning in advance a path having series of movements of each of the manipulators to provide a relatively coarse scale plan for the movements, wherein the planning step determines paths in a configuration space defined by n orthogonal axes corresponding to n configuration settings that define the position of each manipulator in three-dimensional space;

controlling the path execution in such a way as to move the manipulators primarily in accordance with the relatively coarse scale plan provided by the planning step, and including an additional step of generating collision avoidance object control signals based on an artificial force field model, wherein the step of controlling the path execution movement includes interpolating between coarse path planning waypoints to generate finer resolution planned paths, generating control signals based on the finer resolution paths through configuration space and predicted configuration settings of the manipulators, generating collision avoidance control signals based on mutual proximity of manipulators and any obstacles in the workspace, and combining the collision avoidance control signals and the control signals based on the finer resolution planned paths, wherein collision avoidance is achieved by modifying the paths planned through the configuration space; and applying control signals to the manipulators in such that they are moved along paths determined in part by the path planning step and in part by the step of controlling the path execution, whereby the manipulators are moved from starting points to desired endpoints without collisions with each other or with any stationary obstacles.

23. A method as defined in claim 22, wherein the path planning step includes:

setting up a configuration-space database defining the workspace as multiple n-dimensional cell;

determining a collision status for each cell of the configuration space database, wherein the collision status is either "full," indicating that there is a potential for collision for all combinations of configuration settings within the cell, or "free," indicating that there is no potential for collision in the cell, or "mixed,"indicating that there is potential for collision for some combinations of configuration settings within the cell; and generating a coarse path plan using information about each cell of the configuration-space database, to provide for movement in a path from one point in configuration space to another in such a manner that collisions are avoided.

24. A method as defined in claim 23, wherein the step of generating a course path includes:

generating time data for multiple segments of the coarse path, based on given dynamic constraints to be applied to joint variables.

25. A method as defined in claim 24, wherein the interpolating step includes generating time data to be used in planning the interpolated path based on dynamic contraints to be applied to joint variables.

26. A method as defined in claim 23, wherein the step of generating a coarse path plan includes:

selecting a first trial path and determining whether the path passes through any full or mixed cells; and systematically selecting a second and other trial paths, if the earlier selected trial paths are subject to collision, wherein a collision-free path is ultimately selected.

27. A method as defined in claim 26, wherein the step of systematically selecting a second and other trial paths include:

detecting a midpoint in a portion of the trial path that passes through a collision region of full or mixed cells; and selecting a trial waypoint located on a line through the midpoint and orthogonal to the trial path passes through the midpoint, wherein the trial waypoint is selected as being on the planned path if the trial waypoint is not in the collision region.

28. A method as defined in claim 22, wherein the step of controlling the path execution further includes:

dynamically modeling movement of the manipulators, to provide estimates of manipulator configuration joint setting for use in the step of generating control signals based on the finer resolution paths and in the step of generating collision avoidance control signals.

* * * * *